(12) United States Patent
Huang et al.

(10) Patent No.: US 11,297,629 B2
(45) Date of Patent: Apr. 5, 2022

(54) METHOD AND APPARATUS FOR CARRIER AGGREGATION IN SIDELINK COMMUNICATION

(71) Applicant: ZTE CORPORATION, Guangdong (CN)

(72) Inventors: Ying Huang, Guangdong (CN); Lin Chen, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 104 days.

(21) Appl. No.: 16/823,147

(22) Filed: Mar. 18, 2020

(65) Prior Publication Data

US 2020/0221467 A1 Jul. 9, 2020

Related U.S. Application Data

(63) Continuation of application No. PCT/CN2017/104102, filed on Sep. 28, 2017.

(51) Int. Cl.
| | |
|---|---|
| *H04L 12/28* | (2006.01) |
| *H04W 72/08* | (2009.01) |
| *H04W 72/04* | (2009.01) |
| *H04J 1/16* | (2006.01) |

(52) U.S. Cl.
CPC ..... *H04W 72/085* (2013.01); *H04W 72/0453* (2013.01)

(58) Field of Classification Search
CPC ...... H04L 43/16; H04W 72/02; H04W 72/10; H04W 72/0453; H04W 92/18; H04W 28/0284; H04W 76/14

USPC ................. 370/252, 329, 386, 430
See application file for complete search history.

(56) References Cited

U.S. PATENT DOCUMENTS

| 11,044,651 | B2 * | 6/2021 | Hong ................. H04L 5/001 |
| 2017/0245245 | A1 | 8/2017 | Kim |
| 2018/0192459 | A1 | 7/2018 | Xu et al. |
| 2018/0234889 | A1 * | 8/2018 | Baghel .............. H04W 24/08 |
| 2020/0229194 | A1 * | 7/2020 | Belleschi .......... H04W 72/0453 |

FOREIGN PATENT DOCUMENTS

CN 106376082 A 2/2017

OTHER PUBLICATIONS

Huawei, Hisilicon, "Miscellaneous correction to U2X in TS 36.300", 3GPP TSG-RAN WG2 Meeting #99, R2-1 707958, Berlin, Germany, Aug. 21-25, 2017, 9 pages.

LG Electronics Inc., "Correction to synchronization reference source for the frequency in 36.300", 3GPP TSG-RAN2 Meeting #99, R2-1709137, Berlin, Germany, Aug. 21-25, 2017, 5 pages.

(Continued)

*Primary Examiner* — John Pezzlo
(74) *Attorney, Agent, or Firm* — Duane Morris LLP

(57) ABSTRACT

A method and apparatus for carrier aggregation is disclosed. In one embodiment, a method performed by a first wireless communication node, comprising: receiving a downlink signal containing first information from a second wireless communication node, and based on at least a portion of the first information, determining first resource information to perform sidelink communication between the first wireless communication node and at least one third wireless communication node.

18 Claims, 4 Drawing Sheets

(56) References Cited

OTHER PUBLICATIONS

CATT, "Multi-Carrier Operation for Sidelink V2X" 3GPP TSG-RAN WG2 Meeting #96, R2-168109, Reno, USA, Nov. 4, 2016, 4 pages.
CATT, "CBR Measurement and Report", 3GPP TSG-RAN WG2 Meeting #96, R2-168106, Reno, USA, Nov. 13, 2016, 4 pages.
CATT, "Carrier configuration and carrier selection in eV2X CA" 3GPP TSG-RAN WG2 #99, R2-1708052, Berlin, Germany, Aug. 20, 2017, 4 pages.
Ericsson, "Carrier Aggregation Enhancements for PC5" 3GPP TSG-RAN WG2 #99, R2-1709366, Berlin, Germany, Aug. 20, 2017, 4 pages.
Samsung, "Discussion on congestion control" 3GPP TSG RAN WG1 Meeting #87, R1-161Z392, Reno, USA, Nov. 4, 2016, 8 pages.
Huawei, "Introduce VZX in TS 36.331" 3GPP TSG RAN WG2 Meeting #97, RZ-1702420, Athens, Greece, Feb. 13-17, 2016, 101 pages.
Ericsson, "Congestion control in VZX Sidelink" 3GPP TSG RAN WG2 Meeting #94, RZ-164106, Nanjing, China, May 13, 2016, 7 pages.

* cited by examiner

METHOD AND APPARATUS FOR CARRIER AGGREGATION IN SIDELINK COMMUNICATION

TECHNICAL FIELD

This disclosure relates generally to wireless communications and, more particularly, to a method and apparatus for carrier aggregation in sidelink communication.

BACKGROUND

Sidelink (SL) communication is a wireless radio communication directly between two or more user equipment devices (hereinafter "UEs"). In the SL communications, two or more UEs that are geographically proximate to each other can directly communicate without going through an eNodeB or a base station (hereinafter "BS"), or a core network. Data transmission in the SL communication is thus different from typical cellular network communications, e.g., transmitting data to a BS (i.e., uplink transmissions) or receiving date from a BS (i.e., downlink transmissions). In the SL communications, data is transmitted directly from a source UE (i.e., transmitting UE) to a target UE (i.e., receiving UE) through the Unified Air Interface, e.g., PC5 interface, without passing through a BS.

Carrier aggregation (hereinafter "CA") is one of the major features of LTE (long-term evolution)-advances, in which a number of separate carriers (hereinafter "component carriers" or "CC") are combined for downlink and/or uplink transmissions. Carriers for combination can be contiguous or in the same frequency band and can be applied to both the FDD (frequency-domain division) and TDD (time-domain division) variants of LTE. This enables increased peak user data rates and increased overall capacities of networks. Currently, CA in LTE-Advanced enables it to combine 10 MHz carriers in its 800 MHz and 1.8 GHz band to achieve peak downlink user data rates of 150 Mbps. Future development in CA for LTE and 5G communication includes increasing number of CCs and thus total bandwidth for both downlink (DL) and uplink (UL), application of CA in small cell and heterogeneous networks, and enabling flexible CA.

The SL communication is supported and typically used in communications such as Device-to-Device (D2D), or Vehicle-to-Everything (V2X) communications. In the SL communication, there consists at least one UE which can directly communicate with at least another UE to realize the SL communication. In order to meet the requirement of high reliability and low latency, high capacity, and increased data rate, PC5-CA (up to 8 CCs) can be used. Currently, the UEs can select the proper CCs for PC5-CA based on their data service types, from which frequencies can be derived based on a predefined mapping relationship between the service type and frequency. In practice, considering cost and actual deployment, some UEs are limited with their reception capabilities (e.g., number of CCs that is supported for simultaneous transmission). Thus, there exists a need to develop proper protocols for a dynamic allocation frequency-domain resources (e.g., suitable CCs) for PC5-CA in SL communications.

SUMMARY OF THE INVENTION

The exemplary embodiments disclosed herein are directed to solving the issues related to one or more problems presented in the prior art, as well as providing additional features that will become readily apparent by reference to the following detailed description when taken in conjunction with the accompany drawings. In accordance with various embodiments, exemplary systems, methods, and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the invention.

In one embodiment, a method performed by a first wireless communication node includes: receiving a downlink signal containing first information from a second wireless communication node, and based on at least a portion of the first information, determining first resource information to perform sidelink communication between the first wireless communication node and at least one third wireless communication node.

In another embodiment, a method performed by a second wireless communication node includes: transmitting a downlink signal containing information to a first wireless communication node, wherein the information is used by the first wireless communication node to determine resource information to perform sidelink communication between the first wireless communication node and at least one third wireless communication node.

In yet another embodiment, a method performed by a first wireless communication node includes: transmitting an uplink signal to a second wireless communication node, wherein the uplink signal comprises assistance information for the second wireless communication node to determine resource information for the first wireless communication node to perform sidelink communication with at least one third wireless communication node; receiving a downlink signal comprising the resource information from the second wireless communication node; and performing the sidelink communication with at least one third wireless communication node using the resource information.

In yet another embodiment, a method performed by a second wireless communication node includes: receiving an uplink signal from a first wireless communication node, wherein the uplink signal comprises assistance information; and determining resource information for the first wireless communication node to perform sidelink communication with at least one third wireless communication node.

BRIEF DESCRIPTION OF THE DRAWINGS

Aspects of the present disclosure are best understood from the following detailed description when read with the accompanying figures. It is noted that various features are not necessarily drawn to scale. In fact, the dimensions and geometries of the various features may be arbitrarily increased or reduced for clarity of discussion.

DETAILED DESCRIPTION OF EXEMPLARY EMBODIMENTS

Figure 1A:
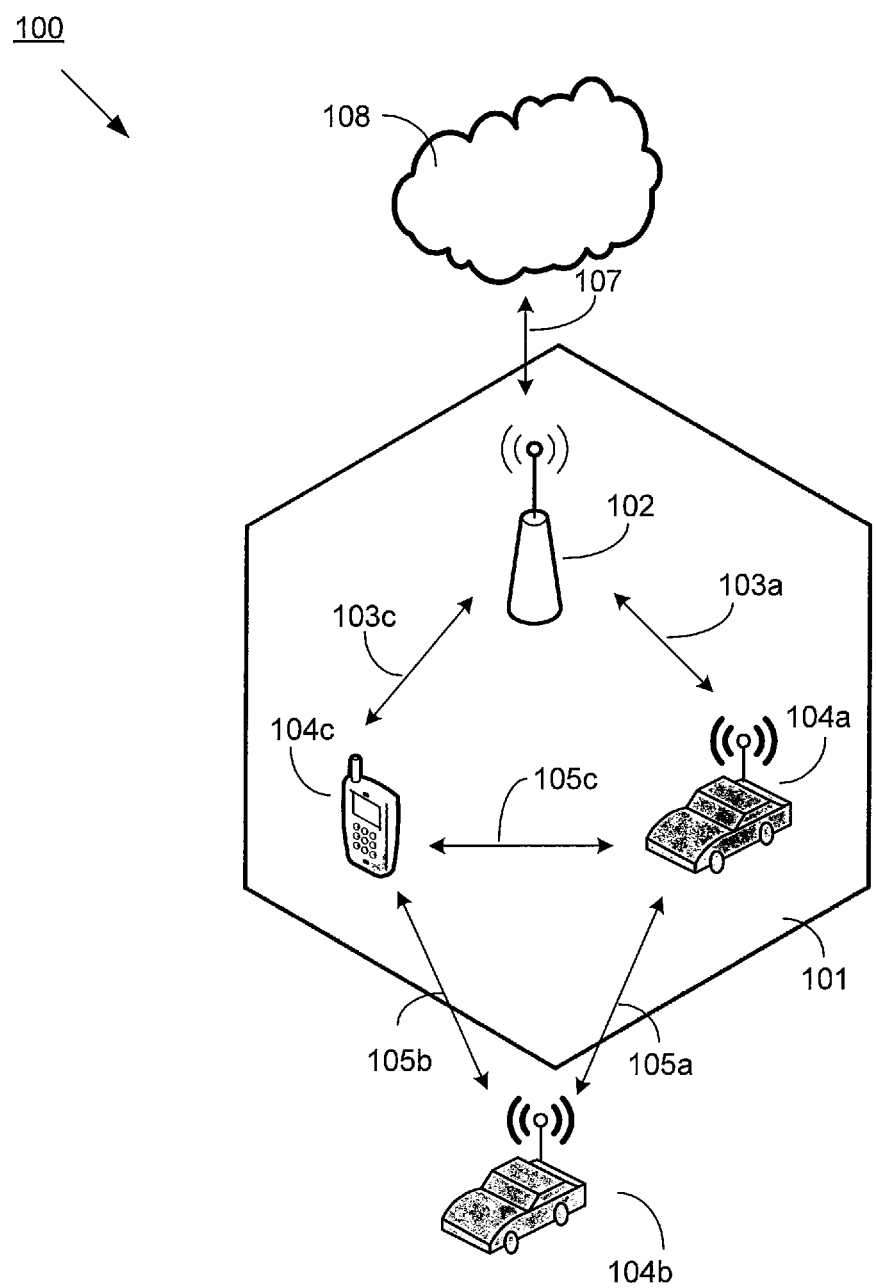
FIG. 1A illustrates an exemplary wireless communication network illustrating scenarios in sidelink communications, in accordance with some embodiments of the present disclosure.

Various exemplary embodiments of the invention are described below with reference to the accompanying figures to enable a person of ordinary skill in the art to make and use the invention. As would be apparent to those of ordinary skill in the art, after reading the present disclosure, various changes or modifications to the examples described herein can be made without departing from the scope of the invention. Thus, the present invention is not limited to the exemplary embodiments and applications described or illustrated herein. Additionally, the specific order or hierarchy of steps in the methods disclosed herein are merely exemplary approaches. Based upon design preferences, the specific order or hierarchy of steps of the disclosed methods or processes can be re-arranged while remaining within the scope of the present invention. Thus, those of ordinary skill in the art will understand that the methods and techniques disclosed herein present various steps or acts in a sample order, and the invention is not limited to the specific order or hierarchy presented unless expressly stated otherwise.

Embodiments of the present invention are described in detail with reference to the accompanying drawings. The same or similar components may be designated by the same or similar reference numerals although they are illustrated in different drawings. Detailed descriptions of constructions or processes well-known in the art may be omitted to avoid obscuring the subject matter of the present invention. Further, the terms are defined in consideration of their functionality in embodiment of the present invention, and may vary according to the intention of a user or an operator, usage, etc. Therefore, the definition should be made on the basis of the overall content of the present specification.

FIG. 1A illustrates an exemplary wireless communication network 100 illustrating a sidelink communication within and out of a coverage of a cellular network, in accordance with some embodiments of the present disclosure. In a wireless communication system, a network side communication node or a base station (BS) can be a node B, an E-utran Node B (also known as Evolved Node B, eNodeB or eNB), a pico station, a femto station, or the like. A terminal side node or a user equipment (UE) can be a long range communication system like a mobile phone, a smart phone, a personal digital assistant (PDA), tablet, laptop computer, or a short range communication system such as, for example a wearable device, a vehicle with a vehicular communication system and the like. A network and a terminal side communication node are represented by a BS 102 and a UE 104, respectively, which are generally referred to as "communication nodes" hereinafter in all the embodiments in this disclosure. Such communication nodes may be capable of wireless and/or wired communications, in accordance with various embodiments of the invention. It is noted that all the embodiments are merely preferred examples, and are not intended to limit the present disclosure. Accordingly, it is understood that the system may include any desired combination of UEs and BSs, while remaining within the scope of the present disclosure.

Referring to FIG. 1A, the wireless communication network 100 includes a BS 102 and UE 104a, UE 104b and a UE 104c, The UE 104a can be a vehicle (V-UE) or a pedestrian (P-UE) that is moving in the cell and meanwhile has a direct communication channel with the BS 102 operating at a first frequency f1. Similarly, the UE 104b can be also a vehicle that is moving in the same cell, but may not have a direct communication channel (e.g., 103a) with the BS 102 or is out of coverage of the cell 101. Although the UE 104b does not have a direct communication channel with the BS 102, it forms direct communication channels (e.g. 105a and 105b) with its neighbor UEs, e.g., UE 104a and UE 104c operating a second frequency f2 and a third frequency f3, respectively. In some embodiments, the second frequency f2 and the third frequency f3 are different from the first frequency f1. In some embodiments, the second frequency f2 and the third frequency are the same as the first frequency f1. The UE 104c can be a mobile device that also has a direct communication channel 103c with the BS 102 operating at the first frequency f1. In some embodiments, direct communication channels (e.g, 105a and 105b) can operate at a plurality of frequencies for SL communication.

The direct communication channels between the UE 104 and the BS 102 can be through interfaces such as an Uu interface, which is also known as UMTS (Universal Mobile Telecommunication System (UMTS) air interface. The direct communication channels 105 between the UEs can be through a PC5 interface, which is introduced to address high moving speed and high density applications such as Vehicle-to-Vehicle (V2V) communications. The BS 102 is connected to a core network (CN) 108 through an external interface 107, e.g., an Iu interface.

The UE 104a and 104c obtains its synchronization timing from the BS 102, which obtains its own synchronization timing from the core network 108 through an internet time service, such as a public time NTP (Network Time Protocol) server or a RNC (Radio Frequency Simulation System Network Controller) server. This is known as network-based synchronization. Alternatively, the BS 102 can also obtain synchronization timing from a Global Navigation Satellite System (GNSS) (not shown) through a satellite signal 106, especially for a large BS in a large cell which has a direct line of sight to the sky, which is known as satellite-based synchronization. The UE 104b obtains its synchronization timing from the other UEs 104a and 104c through sidelink communication.

Figure 1B:
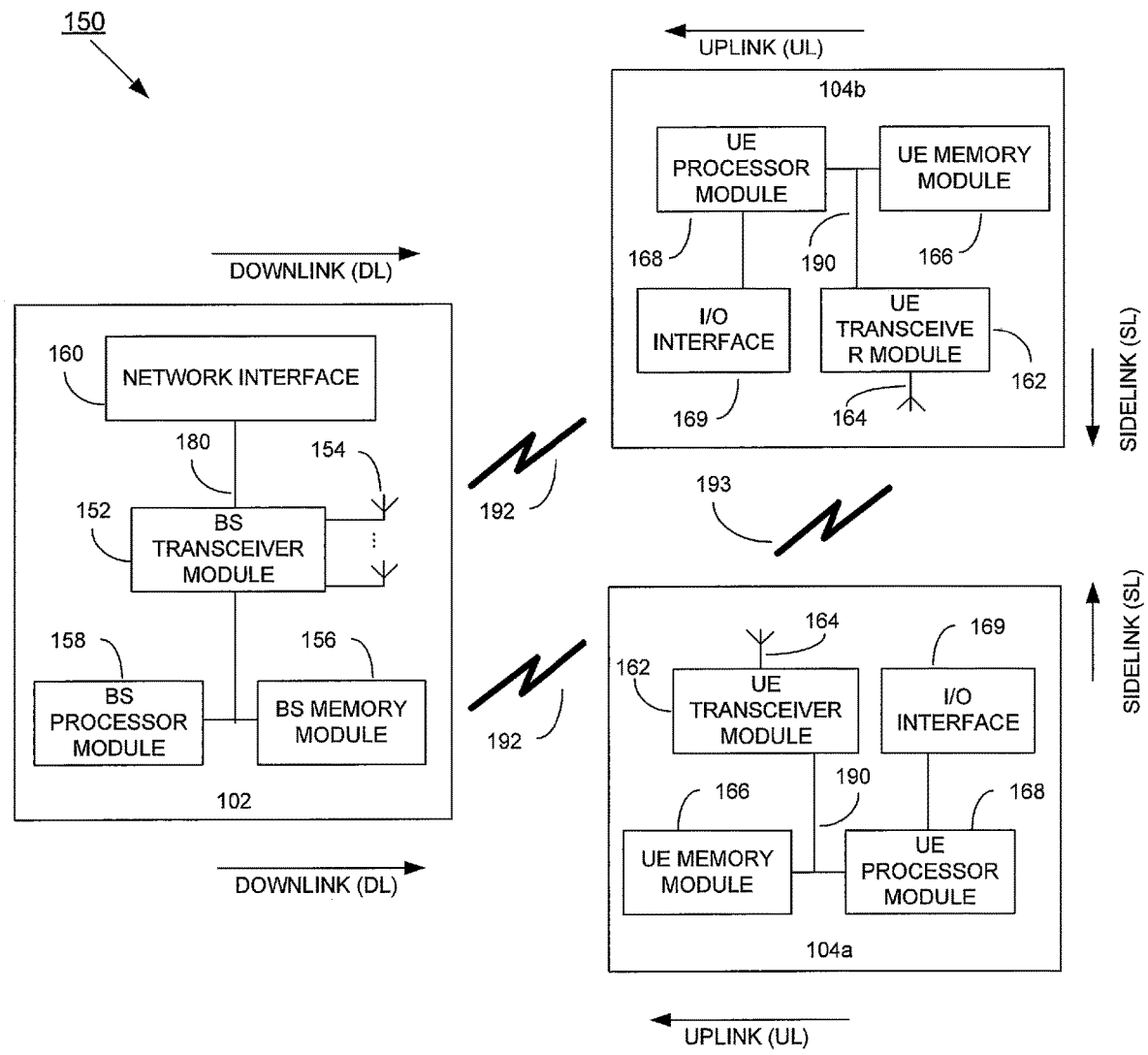
FIG. 1B illustrates a block diagram of an exemplary wireless communication system for transmitting and receiving downlink, uplink and sidelink communication signals, in accordance with some embodiments of the present disclosure.

FIG. 1B illustrates a block diagram of an exemplary wireless communication system 150 for transmitting and receiving downlink, uplink and sidelink communication signals, in accordance with some embodiments of the present disclosure. The system 150 may include components and elements configured to support known or conventional operating features that need not be described in detail herein. In one exemplary embodiment, system 150 can be used to transmit and receive data symbols in a wireless communication environment such as the wireless communication network 100 of FIG. 1A, as described above.

System 150 generally includes a BS 102 and two UEs 104a and 104b, collectively referred to as UE 104 below for ease of discussion. The BS 102 includes a BS transceiver module 152, a BS antenna array 154, a BS memory module 156, a BS processor module 158, and a network interface 160, each module being coupled and interconnected with one another as necessary via a data communication bus 180. The UE 104 includes a UE transceiver module 162, a UE antenna 164, a UE memory module 166, a UE processor module 168, and a I/O interface 169, each module being coupled and interconnected with one another as necessary via a date communication bus 190. The BS 102 communicates with the UE 104 via a communication channel 192, which can be any wireless channel or other medium known in the art suitable for transmission of data as described herein.

As would be understood by persons of ordinary skill in the art, system 150 may further include any number of modules other than the modules shown in FIG. 1B. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as limiting the scope of the present invention.

A wireless transmission from a transmitting antenna of the UE 104 to a receiving antenna of the BS 102 is known as an uplink transmission, and a wireless transmission from a transmitting antenna of the BS 102 to a receiving antenna of the UE 104 is known as a downlink transmission. In accordance with some embodiments, a UE transceiver 162 may be referred to herein as an "uplink" transceiver 162 that includes a RF transmitter and receiver circuitry that are each coupled to the UE antenna 164. A duplex switch (not shown) may alternatively couple the uplink transmitter or receiver to the uplink antenna in time duplex fashion. Similarly, in accordance with some embodiments, the BS transceiver 152 may be referred to herein as a "downlink" transceiver 152 that includes RF transmitter and receiver circuitry that are each coupled to the antenna array 154. A downlink duplex switch may alternatively couple the downlink transmitter or receiver to the downlink antenna array 154 in time duplex fashion. The operations of the two transceivers 152 and 162 are coordinated in time such that the uplink receiver is coupled to the uplink UE antenna 164 for reception of transmissions over the wireless communication channel 192 at the same time that the downlink transmitter is coupled to the downlink antenna array 154. Preferably, there is close synchronization timing with only a minimal guard time between changes in duplex direction. The UE transceiver 162 communicates through the UE antenna 164 with the BS 102 via the wireless communication channel 192 or with other UEs via the wireless communication channel 193. The wireless communication channel 193 can be any wireless channel or other medium known in the art suitable for sidelink transmission of data as described herein.

The UE transceiver 162 and the BS transceiver 152 are configured to communicate via the wireless data communication channel 192, and cooperate with a suitably configured RF antenna arrangement 154/164 that can support a particular wireless communication protocol and modulation scheme. In some exemplary embodiments, the UE transceiver 162 and the BS transceiver 152 are configured to support industry standards such as the Long Term Evolution (LTE) and emerging 5G standards, and the like. It is understood, however, that the invention is not necessarily limited in application to a particular standard and associated protocols. Rather, the UE transceiver 162 and the BS transceiver 152 may be configured to support alternate, or additional, wireless data communication protocols, including future standards or variations thereof.

The processor modules 158 and 168 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 158 and 168, respectively, or in any practical combination thereof. The memory modules 156 and 166 may be realized as RAM memory, flash memory, ROM memory, EPROM memory, EEPROM memory, registers, a hard disk, a removable disk, a CD-ROM, or any other form of storage medium known in the art. In this regard, the memory modules 156 and 166 may be coupled to the processor modules 158 and 168, respectively, such that the processors modules 158 and 168 can read information from, and write information to, memory modules 156 and 166, respectively. The memory modules 156 and 166 may also be integrated into their respective processor modules 158 and 168. In some embodiments, the memory modules 156 and 166 may each include a cache memory for storing temporary variables or other intermediate information during execution of instructions to be executed by processor modules 158 and 168, respectively. Memory modules 156 and 166 may also each include non-volatile memory for storing instructions to be executed by the processor modules 158 and 168, respectively.

The network interface 160 generally represents the hardware, software, firmware, processing logic, and/or other components of the base station 102 that enable bi-directional communication between BS transceiver 152 and other network components and communication nodes configured to communication with the BS 102. For example, network interface 160 may be configured to support internet or WiMAX traffic. In a typical deployment, without limitation, network interface 160 provides an 802.3 Ethernet interface such that BS transceiver 152 can communicate with a conventional Ethernet based computer network. In this manner, the network interface 160 may include a physical interface for connection to the computer network (e.g., Mobile Switching Center (MSC)). The terms "configured for" or "configured to" as used herein with respect to a specified operation or function refers to a device, component, circuit, structure, machine, signal, etc. that is physically constructed, programmed, formatted and/or arranged to perform the specified operation or function. The network interface 160 could allow the BS 102 to communicate with other BSs or core network over a wired or wireless connection.

Referring again to FIG. 1A, as mentioned above, the BS 102 repeatedly broadcasts system information associated with the BS 102 to one or more UEs (e.g., 104) so as to allow the UE 104 to access the network within the cell 101 where the BS 102 is located, and in general, to operate properly within the cell 101. Plural information such as, for example, downlink and uplink cell bandwidths, downlink and uplink configuration, configuration for random access, etc., can be included in the system information, which will be discussed in further detail below. Typically, the BS 102 broadcasts a first signal carrying some major system information, for example, configuration of the cell 101 through a PBCH (Physical Broadcast Channel). For purposes of clarity of illustration, such a broadcasted first signal is herein referred to as "first broadcast signal." It is noted that the BS 102 may subsequently broadcast one or more signals carrying some other system information through respective channels (e.g., a Physical Downlink Shared Channel (PDSCH)), which are herein referred to as "second broadcast signal," "third broadcast signal," and so on.

Referring again to FIG. 1B, in some embodiments, the major system information carried by the first broadcast signal may be transmitted by the BS 102 in a symbol format via the communication channel 192 (e.g., a PBCH). In accordance with some embodiments, an original form of the major system information may be presented as one or more sequences of digital bits and the one or more sequences of digital bits may be processed through plural steps (e.g., coding, scrambling, modulation, mapping steps, etc.), all of which can be processed by the BS processor module 158, to become the first broadcast signal. Similarly, when the UE 104 receives the first broadcast signal (in the symbol format) using the UE transceiver 162, in accordance with some embodiments, the UE processor module 168 may perform plural steps (de-mapping, demodulation, decoding steps, etc.) to estimate the major system information such as, for example, bit locations, bit numbers, etc., of the bits of the major system information. The UE processor module 168 is also coupled to the I/O interface 169, which provides the UE 104 with the ability to connect to other devices such as computers. The I/O interface 169 is the communication path between these accessories and the UE processor module 168.

In some embodiments, the UE 104 can operate in a hybrid communication network in which the UE communicates with the BS 102, and with other UEs, e.g., between 104a and 104b. As described in further detail below, the UE 104 supports sidelink communications with other UE's as well as downlink/uplink communications between the 13S 102 and the UE 104. As discussed above, sidelink communication allows the UEs 104a and 104b to establish a direct communication link with each other, or with other UEs from different cells, without requiring the BS 102 to relay data between UE's.

Figure 2:
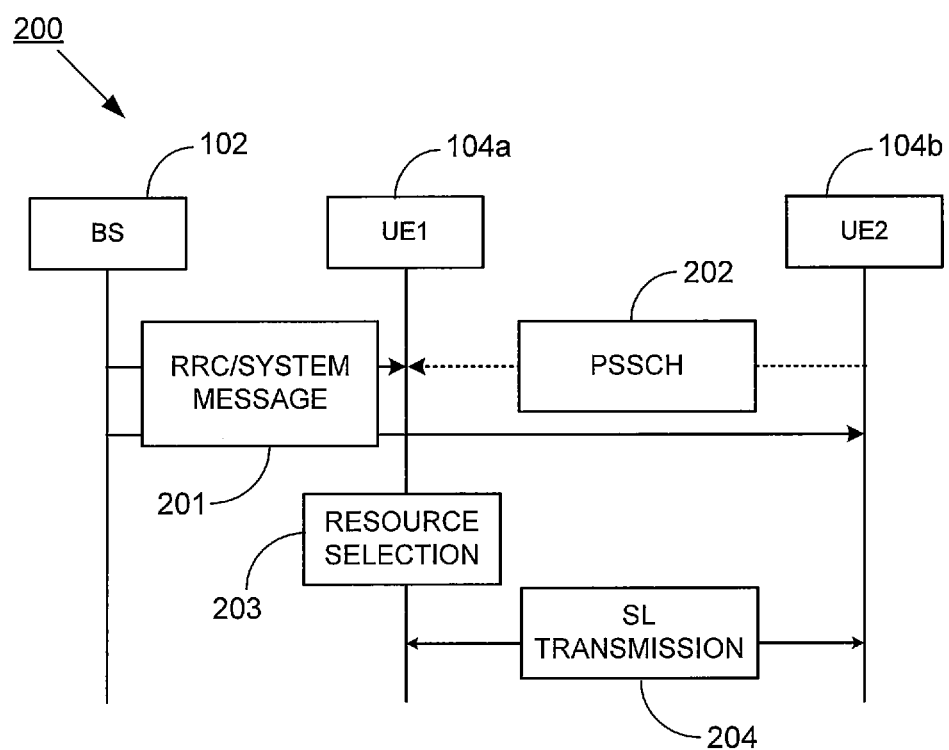
FIG. 2 illustrates a method of obtaining suitable component carriers for PC5 carrier aggregation in sidelink communications, according to some embodiments of the present disclosure.

FIG. 2 illustrates a method 200 of obtaining at least one suitable component carrier (CC) in PC5 carrier aggregation (CA) for SL communications, in accordance with some embodiments of the present disclosure. It is understood that additional operations may be provided before, during, and after the method 200 of FIG. 2, and that some other operations may be omitted or only briefly described herein.

The method 200 starts with operation 201, where a BS 102 transmits a message to the UE1 104a and UE2 104b. The message comprises information that are used for the determination of at least one suitable carrier frequency or at least two suitable CCs in PC5-CA for SL communications. In some embodiments, this message is transmitted from the BS 102 to the UE1 104a and UE2 104b in a form of a control signaling, e.g., RRC (Radio Resource Control) message from a layer above the physical layer, or a system message. This message can be broadcasted and/or unicasted on channels such as PBCH (physical broadcast channel) or PDSCH (physical downlink shared channel) and the like.

In some embodiments, the information transmitted in the message from the BS 102 to the UE1 104a and UE2 104b comprises at least one of the following information, at least one channel busy ratio (CBR) threshold value, at least one PC5 link quality threshold value, a mapping relationship between service type/quality of service (QoS) requirement and number of required CC, and a mapping relationship between service type/QoS requirement and frequency identity.

In some embodiments, the information transmitted in the message from the BS 102 to the UE1 104a and UE2 104b comprises at least one CBR threshold value. A CBR value is a value between 0 and 1, representing busy ratio as the portion of sub-channels whose power of received signal (received signal strength indicator, or $S_{RSSI}$) are greater than a power threshold value (e.g. −85 dBm). In some embodiments, the information comprises a plurality of CBR threshold values, wherein each of the plurality of CBR threshold values are associated with a service type and/or a QoS requirement. The QoS requirement indicates at least one of the following parameters, including data priority, packet delay budget, packet error rate, data rate, and reliability of the data packet to be transmitted. In some embodiments, the QoS requirement can be an index value and have a mapping relationship with the CBR threshold value. For example, the CBR threshold value corresponding to service data transmission with high priority and high data rate can be larger than the CBR threshold value corresponding to service data transmission with low priority and low data rate, so that there can be more suitable CCs available for a SL transmission at high data rate.

In some embodiments, the information transmitted in the message from the BS 102 to the UE1 104a and UE2 104b comprises at least one PC5 link quality threshold value, wherein the PC5 quality threshold value is described by parameters, such as for instance reference signal received power (RSRP), reference signal received quality (RSRQ), signal to interference plus noise ratio (SINR), and the like. In some embodiments, the information comprises a plurality of PC5 quality threshold values, wherein each of the plurality of PC5 quality threshold values is associated with a service type and/or a QoS requirement. The QoS requirement indicates at least one of the following parameters, including data priority, packet delay budget, packet error rate, data rate, reliability of the data packet to be transmitted. In some embodiments, the QoS requirement can be an index value and have a mapping relationship with the PC5 quality threshold value. For example, a PC5 quality threshold value corresponding to service data transmission with high priority and/or high data rate can be lower than the PC5 quality threshold value corresponding to service data transmission with low priority and/or low data rate, so that there can be more suitable CCs available for a SL transmission at high data rate.

In some embodiments, the information transmitted in the message from the BS 102 to the UE1 104a and UE2 104b comprises a mapping relationship between service type/QoS requirement and number of required CC. The QoS requirement indicates at least one of the following parameters, including data priority, packet delay budget, packet error rate, data rate, and reliability of the data packet to be transmitted. In some embodiments, the QoS requirement can be an index value.

In some embodiments, the information transmitted in the message from the BS 102 to the UE1 104a and UE2 104b comprises a mapping relationship between service type/QoS requirement and frequency identity. The QoS requirement indicates at least one of the following parameters, including data priority, packet delay budget, packet error rate, data rate, reliability of the data packet to be transmitted. In some embodiments, the QoS requirement can be an index value. In some embodiment, the frequency identity comprises at least one of the following parameters, including frequency value, frequency index, and CC index.

In some embodiments, the information transmitted in the message from the BS 102 to the UE1 104*a* and UE2 104*b* comprises a resource information in the time domain for a SL transmission, wherein the resource information in the time domain can be a list of subframe pattern information and corresponding frequency (index).

In some embodiments, the information transmitted in the message from the BS 102 to the UE1 104*a* and UE2 104*b* comprises a list of available carrier frequencies that are supported by the BS 102 and/or frequencies that can be used for a SL transmission.

Alternatively, the method 200 may starts with operation 202, wherein the UE2 104*a* may obtain information that is used for CC selection from other UEs (e.g., UE2 104*b*) through PC5 signaling which can be transmitted on channels such as PSSCH (Physical Sidelink Shared Channel) or the like. In some embodiment, the information transmitted from the UE2 104*b* to the UE1 104*a* comprises at least one of the following parameter values, including capability of UE2 104*b* for PC5-CA, number of CC, carrier frequencies that can be used for transmission/reception and number of receiving chains. In some embodiments, the capability of UE 104*b* for PC5-CA comprise at least one of: a band combination for simultaneous SL reception, band combination for simultaneous Uu/sidelink reception.

In some embodiments, the UE1 104*a* can also receive information from both the BS 102 and the UE2 104*b* simultaneously. In this case, the information received from the BS 102 has a higher priority to be used over the information received from the UE2 104*b* toward the selection of suitable CCs in PC5-CA for a SL transmission if the two kind of information conflicts with each other.

The method 200 continues with operation 203, wherein the UE1 104*a* selects at least one suitable CC for PC5-CA based on the received information in operation 201 from the BS 102 and/or operation 202 from the UE 104*b*. In some embodiments, an upper layer in the UE 104*a* determines a set of candidate carriers according to the service type or the QoS requirement of the data packet, and the mapping relationship between the service type/QoS and frequency. In some embodiments, the upper layer in the UE 104*a* can also determine the number of required CC. Then the upper layer delivers the set of candidate frequencies to a lower layer (Access Stratum or AS layer) of the UE 104*a*. In some embodiments, the upper layer also delivers a number of required CC to the AS layer. The AS layer of the UE1 104*a* determines the transmission frequencies according to at least one of the following parameters, including measured CBR values, measured PC5 link quality values, candidate frequencies, and capability of the UE1 104*a* for PC5-CA.

In some embodiments, the UE1 104*a* determines a CBR value of a frequency (or resource pool) by measuring a received power on the sub-channels and calculate the portion of busy sub-channels in the whole resource pool. In some embodiments, the UE1 104*a* determines the PC5 link quality by measuring the reference signal (RS) transmitted from the UE2 104*b* on channels such as PSSCH (physical sidelink shared channel) and the like.

In some embodiments, the measured CBR values are compared to at least one configured CBR threshold value. In a preferred embodiment, only one CBR threshold value is transmitted from the BS 102 to the UEs 104 during operation 201. If a measured CBR value of a frequency is smaller than the configured CBR threshold value, then the frequency can be a suitable CC in PC5-CA for a SL transmission. If the measured CBR value of a frequency is greater than the configured CBR threshold value, then the frequency is considered not suitable for use as a CC in PC5-CA for a SL transmission. In some embodiments, two configured CBR threshold values (e.g., CBR1<CBR2) are transmitted from the BS 102 to the UEs 104 during operation 201. If the measured CBR value of a frequency is smaller than the CBR1, then the frequency is selected as a suitable CC in PC5-CA for a SL transmission. If the measured CBR value of a frequency is greater than CBR1, then the frequency is considered as not suitable for the SL transmission. In certain embodiments, one of the two configured CBR threshold values (e.g., CBR2) can be used for determining whether the CC becomes not suitable for continuing with the SL transmission, as discussed in detail below, while CBR1 is used for determining whether the frequency is suitable for the SL transmission.

In some embodiments, the measured PC5 link quality values are compared to at least one configured PC5 link quality threshold value. In a preferred embodiment, only one configured PC5 link quality threshold value is transmitted from the BS 102 to the UEs 104 during operation 201. If a measured PC5 link quality value of a frequency is greater than the configured PC5 link quality threshold value, then the frequency is a suitable CC in PC5-CA for a SL transmission. If a measured PC5 link quality value of a frequency is smaller than the pre-configured PC5 link quality threshold value, then the frequency is considered not suitable for a SL transmission. In some embodiments, two configured PC5 link quality threshold values (e.g., $S_{PC5}2 < S_{PC5}1$) are transmitted from the BS 102 to the UEs 104 during operation 201. If a measured PC5 link quality value of a frequency is greater than $S_{PC5}1$, then the frequency is considered as a suitable CC in PC5-CA for a SL transmission. If a measured PC5 link quality value of a frequency is smaller than $S_{PC5}2$, then the frequency is considered not suitable for a SL transmission. In some embodiments, the two configured PC5 link quality threshold values can be used to avoid frequent CC reselection, as discussed in detail below.

In an alternative embodiment, during operation 203 the upper layer in the UE1 104*a* can deliver data packet, service type, QoS requirement, and a mapping relationship between service type and frequency to a lower layer (AS layer) in the UE1 104*a*. Then the AS layer of the UE1 104*a* determines the frequencies which could be used in PC5-CA for a SL communication according to at least one of the following parameters, including the associated service type, the associated QoS requirement, the mapping between service type and frequency, the capability of the UE1 104*a*, the capability of UE2 104 for PC5-CA, and the measured CBR values, and the measured PC5 link quality values.

In another alternative embodiment, during operation 203 a CC can be selected by a non-AS layer (e.g., an upper layer). For example, an upper layer in the UE 104*a* determines a set of candidate carriers according to the service type or the QoS requirement of the data packet, and the mapping relationship between service type/QoS and frequency. In some embodiments, an upper layer in the UE 104*a* can also determine the number of required CC. Then the upper layer delivers the set of candidate frequencies to the AS layer of the UE 104a. In some embodiments, the upper layer also delivers the number of required CC to the AS layer. Then the AS layer can deliver one of the following parameters back to the upper layer of the UE 104a, including measured CBR values, measured PC5 link quality values, service type, associated QoS requirement, a mapping relationship between service type and frequency, and capabilities of the UE1 104a, the capabilities of UE2 104b for PC5-CA, the frequencies of which the CBR value is below the configured threshold, the frequencies of which the PC5 link quality value is above the configured threshold. Finally, the upper layer determines at least one suitable CC which could be used for a SL transmission and meanwhile, indicates to the lower layer of the UE1 104a.

After selecting CCs in operation 203, the UE1 104a selects resources in the time-frequency domain for the SL transmission. In some embodiments, the subframe pattern received from the BS 102 comprises a string of "0" or "1" s, wherein "0" indicates that this subframe on this frequency cannot be used for SL transmission and "1" indicates that this subframe on this frequency can be used for SL transmission. The UEs can further select resource blocks with in a subframe for SL transmission based on sensing of all the candidate resources.

The method 200 continues with operation 204 for the SL transmission when the resources for transmitting or receiving data between the UE1 104a and UE2 104b are selected. After the resources are selected, up to 8 CCs can be allocated to form a first aggregated CCs for the SL transmission to realize higher peak data rates and facilitate efficient use of fragmented spectrum. In some embodiments, when the UE's are vehicles, data in the SL transmission through aggregated CCs may include break/acceleration information and route options which can be triggered by random events, e.g., accident. In some embodiments, the UEs 104 that are V-UEs can obtain environmental and traffic information from a road side unit (RSU) and can broadcast periodically to the other UEs. Meanwhile, the UEs 104 may collect status reports from other UEs and transmit back to the RSU, which can also be an example of a SL transmission.

After the SL transmission is established at the first aggregated CCs, the suitability of the at least one CC in the first aggregated CCs is continuously monitored and evaluated periodically at a predefined period during the SL transmission. This process can be implemented to reinforce and maintain reliable CCs with high data rate and low latency for the SL transmission. In some embodiments, the suitability of the first aggregated CCs is measured by at least one of the following parameters, including the measured CBR values, and the measured PC5 link quality values. If the first aggregated CCs (e.g., frequency) becomes not suitable for the SL transmission, CC reselection procedure can be triggered by the UEs 104 to re-select suitable CCs to form a second aggregated CCs to continue with the existing SL transmission. In some embodiments, the transmitting UE2 104b can trigger the reselection of CCs. For example, if at least one CBR value of the first aggregated CCs becomes greater than the configured threshold value, a second aggregated CCs needs to be selected. In some embodiments, a frequency with a CBR value lower than the configured threshold value can be a suitable CC in PC5-CA for a SL transmission. In some embodiments, a frequency with a CBR value that is lower than the CBR value of the frequency in the first aggregated CCs by a configured CBR offset value can be used as a suitable CC in the second aggregated CCs in PC5-CA for a SL transmission. In some embodiments, the configured CBR offset value for CC reselection can be configured by the BS 102 in operation 201 via broadcast or unicast (i.e., dedicated signaling). In certain embodiments, the UE2 104b measures the CBR value of each CC in the first aggregated CCs based on the received power and calculate the portion of the busy sub-channel in the whole resource pool.

Similarly, a PC5 link quality can be used to measure the suitability of the first aggregated CCs. Specifically, the PC5 link quality values of all CCs in the first aggregated CCs is constantly monitored and evaluated. If a measured PC5 link quality value of a frequency in the first aggregated CCs decreases to a value that is lower than the configured PC5 link quality threshold value transmitted by the BS 102 to the UEs 104 in operation 201, a second aggregated CCs needs to be re-selected to continue with the SL transmission. The PC5 link quality is evaluated through the measurement of reference signal (RS) transmitted from the UE2 104b. In some embodiments, if a PC5 link quality value of a frequency is greater than the configured threshold value, the frequency becomes a suitable CC in PC5-CA for the SL transmission. In some embodiments, if a PC5 link quality value of a frequency which is greater than the PC5 link quality value of the frequency in the first aggregated CCs by a configured PC5 link quality offset value can be also used as a suitable CC. Together with suitable CCs in the first aggregated CCs, the newly-selected suitable CC can be used to form the second aggregated for the SL transmission. In some embodiments, the configured PC5 link quality offset value for CC reselection can be configured by the BS 102 in operation 201 via broadcast or unicast (i.e., dedicated signaling). In some embodiments, the reselection of CCs based on the PC5 link quality values is only applicable in unicast scenario.

The data packets which have not been transmitted on the CC by the time when it is determined to be not suitable to continue with the SL transmission are turned to the newly-selected suitable CC in the second aggregated CCs for continuous transmission, in accordance with various embodiments. At the same time, data packets on all other suitable frequencies in the first aggregated CCs are continuously transmitted and no interruption to the SL transmission is introduced during the CC reselection process.

Figure 3:
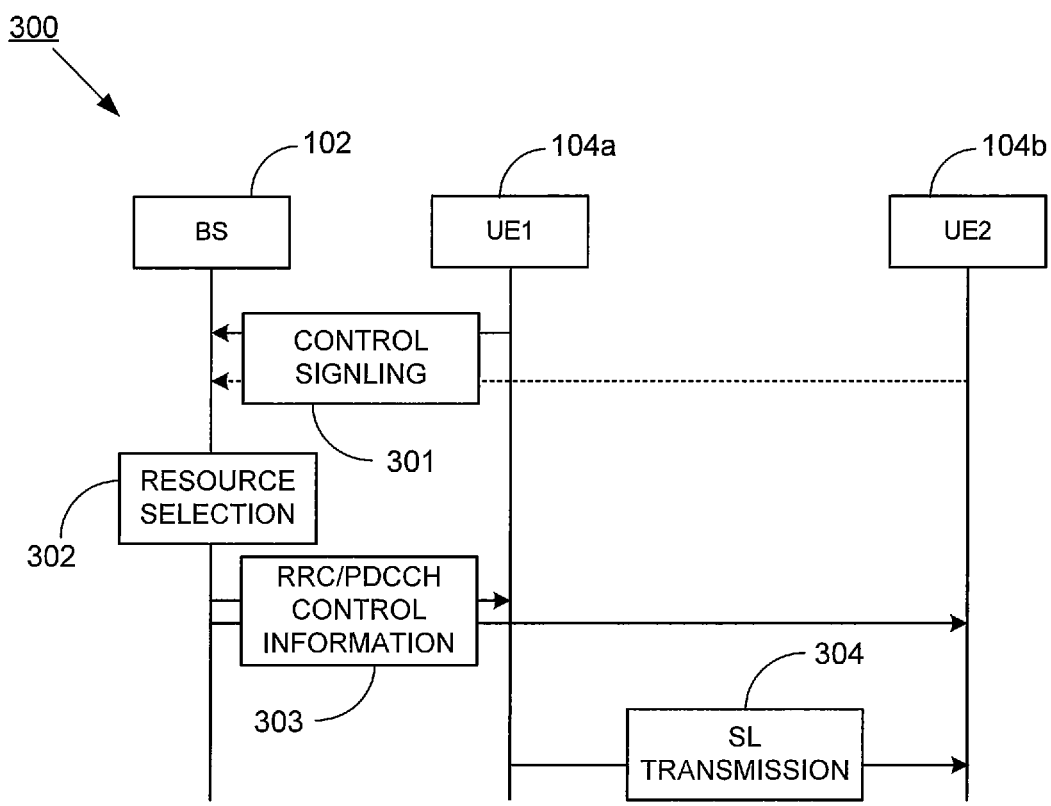
FIG. 3 illustrates a method of obtaining suitable component carriers for PC5 carrier aggregation in sidelink communications, according to some embodiments of the present disclosure.

FIG. 3 illustrates a method 300 of obtaining at least one suitable component carrier in PC5-CA for a SL transmission, in accordance with various embodiments of the present disclosure. It is understood that additional operations may be provided before, during, and after the method 300 of FIG. 3, and that some other operations may be omitted or only briefly described herein.

The method 300 starts with operation 301, where a transmitting UE1 104a transmits a message to a BS 102. In some embodiments, a receiving UE2 104b can also transmit a message to the BS 102 during operation 301 if it is performing unicast communication. The messages comprise assistance information for CC selection, for example when a new SL transmission is to be established between the transmitting and the receiving UEs, in accordance with various embodiments. In some embodiments, the transmitting of assistance information for CC selection from a UE to a BS can be also triggered when the UE is interested in transmitting or receiving one or more types of service. The messages from the UEs 104 can be transmitted to the BS 102 in a form of an uplink control signaling message (e.g., a RRC (Radio Resource Control) message or a control element (CE) in a MAC layer). The assistance information for CC selection transmitted from UEs 104 to the BS 102 comprises at least one of the following parameters, including logical channel group (LCG) ID, service type, QoS requirement, radio bearer identity/logical channel ID, and capabilities of the UEs for PC5-CA, one or more frequency information. In certain embodiments, the LCG ID from the UEs 104 to the BS 102 could implicitly indicate the service type and/or QoS requirements of data packets which needs to be transmitted from the transmitting UE1 104*a* to the receiving UE2 104*b*. Before the UEs transmitting the LCGID to the BS 102, the UEs can acquire a mapping relationship between the LCGID and service type and/or QoS requirements from the BS 102, in accordance with certain embodiments. In some embodiments, the mapping relationship between the LCGID and the service type and/or QoS requirements can be pre-configured. In some embodiments, this mapping relationship can be obtained from an application service. The QoS requirement comprises at least one of the following parameters, including data priority, data packet delay budget, data rate, packet error rate, and QoS index. In some embodiments, the QoS index can be assigned by the BS 102. In certain embodiments, the radio bearer identity or logical channel ID can be used to implicitly indicate the service type and/or QoS requirement. Before the UEs transmitting the radio bearer identity or logical channel ID to the BS 102, the UEs can acquire a mapping relationship between the radio bearer identity and service type and/or QoS requirements, or a mapping relationship between logical channel ID and service type and/or QoS requirements from the BS 102, in accordance with certain embodiments. In some embodiments, the mapping relationship mentioned above can be pre-configured. In some embodiments, this mapping relationship can be obtained from an application service. Similarly to the method 200, the capabilities of the UE for PC5-CA contains at least a band combination for simultaneous SL transmission, band combination for simultaneous Uu/sidelink transmission, band combination for simultaneous SL reception, band combination for simultaneous Uu/sidelink reception in accordance with certain embodiments. In some embodiments, the frequency information indicates on which frequency the UE is requesting sidelink resource.

The method 300 continues with operation 302, where the BS 102 determines the suitable frequencies that can be used for SL transmission. In certain embodiments, the BS 102 determines the resource information for SL transmission based on the information received in the request messages from the UEs 104.

The method 300 continues with operation 303, where the BS 102 allocates time-frequency resources to the transmitting and receiving UEs in a form of a control signaling, e.g., RRC message or PDCCH control information, or a system message. In some embodiments, the BS 102 obtains a mapping relationship between service type and frequency via OAM configuration. The resource information for the SL transmission comprises at least one of the following parameters including resource information in the time-frequency domain for the SL transmission, suitable frequencies that can be used in PC5-CA, time domain information (i.e., a subframe pattern) of the resource and corresponding frequencies, and number of CC required. In certain embodiments, the resource information in the time domain is associated with a service type and/or a frequency.

The method 300 continues with operation 304 for SL transmission when the resources for transmitting or receiving data between the transmitting UE1 104*a* and receiving UE2 104*b* are received from the BS 102. In some embodiments, when the UEs are vehicles, data in the SL transmission may include break/acceleration information and route options which can be triggered by random events, e.g., accident. In some embodiments, the UEs 104 that are V-UEs can obtain environmental and traffic information from a road side unit (RSU) and can broadcast periodically to the other UEs. Meanwhile, the UEs 104 may collect status reports from other UEs and transmit back to the RSU, which can also be an example of a SL transmission.

While various embodiments of the invention have been described above, it should be understood that they have been presented by way of example only, and not by way of limitation. Likewise, the various diagrams may depict an example architectural or configuration, which are provided to enable persons of ordinary skill in the art to understand exemplary features and functions of the invention. Such persons would understand, however, that the invention is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two, which can be designed using source coding or some other technique), various forms of program or design code incorporating instructions (which can be referred to herein, for convenience, as "software" or a "software module), or combinations of both. To clearly illustrate this interchangeability of hardware and software, various illustrative components, blocks, modules, circuits, and steps have been described above generally in terms of their functionality. Whether such functionality is implemented as hardware, firmware or software, or a combination of these technique, depends upon the particular application and design constraints imposed on the overall system. Skilled artisans can implement the described functionality in various ways for each particular application, but such implementation decisions should not be interpreted as causing a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described, in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

The invention claimed is:

1. A method performed by a first wireless communication node, comprising:
   receiving a downlink signal containing a first channel busy ratio (CBR) threshold value and a second CBR threshold value, from a second wireless communication node, and
   based on the first and second CBR threshold values, determining a first resource for use in a sidelink communication between the first wireless communication node and at least one third wireless communication node,
   wherein:
      the first CBR threshold value is different from the second CBR threshold value,
      the first CBR threshold value is used to determine whether the first resource is suitable for use in the sidelink communication and
      the second CBR threshold value is used to determine when the first resource becomes unsuitable for use in the sidelink communication.

2. The method of claim 1, wherein when a measured CBR value of a frequency is smaller than the first CBR threshold value, the frequency is selected as a suitable first resource for use in the sidelink communication.

3. The method of claim 1, wherein the first and second CBR threshold values are each associated with a respective quality of service (QoS) requirement.

4. The method of claim 3, wherein each respective QoS requirement indicates at least one of: data priority, packet delay budget, packet error rate, data rate, or reliability of the data packet to be transmitted.

5. A first wireless communication node, comprising:
   a receiver configured to receive a downlink signal containing a first channel busy ratio (CBR) threshold value and a second CBR threshold value, from a second wireless communication node, and
   at least one processor configured to, based on the first and second CBR threshold values, determine a first resource for use in a sidelink communication between the first wireless communication node and at least one third wireless communication node,
   wherein:
      the first CBR threshold value is different from the second CBR threshold value, and
      the at least one processor is further configured to use the first CBR threshold value to determine whether the first resource is suitable for use in the sidelink communication and use the second CBR threshold value to determine when the first resource becomes unsuitable for use in the sidelink communication.

6. The first wireless communication node of claim 5, wherein when a measured CBR value of a frequency is smaller than the first CBR threshold value, the frequency is selected as a suitable first resource for use in the sidelink communication.

7. The first wireless communication node of claim 5, wherein the first and second CBR threshold values are each associated with a respective quality of service (QoS) requirement.

8. The first wireless communication node of claim 7, wherein each respective QoS requirement indicates at least one of: data priority, packet delay budget, packet error rate, data rate, or reliability of the data packet to be transmitted.

9. A method performed by a first wireless communication node, comprising:

transmitting a downlink signal containing a first channel busy ratio (CBR) threshold value and a second CBR threshold value to a second wireless communication node, wherein the first and second CBR threshold values are configured to indicate a first resource for use in a sidelink communication between the second wireless communication node and at least one third wireless communication node, wherein the first CBR threshold value is different from the second CBR threshold value, and wherein the first CBR threshold value is used to determine whether the first resource is suitable for use in the sidelink communication and the second CBR threshold value is used to determine when the first resource becomes unsuitable for use in the sidelink communication.

10. The method of claim 9, wherein when a measured CBR value of a frequency is smaller than the first CBR threshold value, the frequency is selected as a suitable first resource for use in the sidelink communication.

11. The method of claim 9, wherein the first and second CBR threshold values are each associated with a respective quality of service (QoS) requirement.

12. The method of claim 11, wherein each respective QoS requirement indicates at least one of: data priority, packet delay budget, packet error rate, data rate, or reliability of the data packet to be transmitted.

13. A first wireless communication node, comprising:
a transmitter configured to transmit a downlink signal containing a first channel busy ratio (CBR) threshold value and a second CBR threshold value to a second wireless communication node, wherein the first and second CBR threshold values are configured to indicate a first resource for use in a sidelink communication between the second wireless communication node and at least one third wireless communication node, wherein the first CBR threshold value is different from the second CBR threshold value, and wherein the first CBR threshold value is used to determine whether the first resource is suitable for use in the sidelink communication and the second CBR threshold value is used to determine when the first resource becomes unsuitable for use in the sidelink communication.

14. The first wireless communication node of claim 13, wherein when a measured CBR value of a frequency is smaller than the first CBR threshold value, the frequency is selected as a suitable first resource for use in the sidelink communication.

15. The first wireless communication node of claim 13, wherein the first and second CBR threshold values are each associated with a respective quality of service (QoS) requirement.

16. The first wireless communication node of claim 15, wherein each respective QoS requirement indicates at least one of: data priority, packet delay budget, packet error rate, data rate, or reliability of the data packet to be transmitted.

17. A non-transitory computer-readable medium storing computer-executable instructions that when executed perform the method of claim 1.

18. A non-transitory computer-readable medium storing computer-executable instructions that when executed perform the method of claim 9.

* * * * *